Aug. 5, 1969 L. I. MAISSEL ET AL 3,458,926

METHOD OF FORMING A GLASS FILLED GAP

Filed Oct. 8, 1965

INVENTORS
LEON I. MAISSEL
DAVID L. WILCOX

BY Wolmar J. Stoffel
ATTORNEY

United States Patent Office 3,458,926
Patented Aug. 5, 1969

3,458,926

METHOD OF FORMING A GLASS FILLED GAP

Leon I. Maissel, Poughkeepsie, and David L. Wilcox, Hopewell Junction, N.Y., assignors to International Business Machines Corporation, Armonk, N.Y., a corporation of New York Filed Oct. 8, 1965, Ser. No. 494,140
Int. Cl. G11b *5/42*
U.S. Cl. 29—603 8 Claims

ABSTRACT OF THE DISCLOSURE

A method of spacing circuit parts of a magnetic head to define a gap with an adherent layer of glass by (1) applying by R.F. sputter techniques a first layer of glass of a predetermined thickness to each of the respective parts, (2) applying by R.F. sputter techniques a relatively thin layer of glass over at least one of the first layers of glass, the glass of a second layer having a softening point appreciably less than the softening point of the glass of the first layer, (3) positioning the respective parts with the layers of glass in abutting relation, and (4) heating the assembly to the softening point temperature of the glass of the second layer to thereby fuse the glass layers.

This invention relates to a method of precisely spacing and adhering elements in a fixed relationship with a thin layer of material, more particularly to a method of forming a gap having disposed therein a nonmagnetic material. Still more specifically, this invention relates to a method of precisely spacing portions of circuit parts of a magnetic recording head to define a gap while simultaneously forming an adherent layer of nonmagnetic material in the gap to permanently maintain the spacing of the parts.

Magnetic heads for recording and/or reproducing apparatus, computer apparatus, etc., normally consist of at least two circuit parts made of a magnetic material, as for example sintered ferromagnetic oxide, between which is provided an effective gap, and a coil disposed about one of the circuit parts. The gap can be an air gap, or can be filled in with a nonmagnetic material, such as glass. The gap provides a high reluctance area with the tape serving as a low reluctance path for the magnetic flux in the head. The smaller the gap width, the more concentrated will be the magnetic flux lines through the tape. As the number of tracks on the tape is increased, and the tape speeds are increased, the greater becomes the need for better resolution of the recording and pickup magnetic impulse performance of the head. Increased resolution can be obtained by decreasing the width of the gap in the magnetic head.

However, when the width of the gap is decreased to a very thin dimension, as is necessary to meet the desired objective in modern technology, the practical production and assembly techniques of obtaining the narrow widths to the accuracy desired become increasingly more difficult. One known method is to put a thin sheet of glass between the pole parts and heat the assembly to the softening point of the glass. However, this method does not assure accuracy of the gap width. Some pressure must be applied to the pole parts during the heating to assure bonding of the parts and to also maintain the assembly in assembled relation. Small variation in pressure will cause significant variations in the thickness of the gap since more or less glass will be forced out from between the pole pieces when it is in the softened condition. Also, the time interval and temperature of heating also influence the gap width. Still further, the cutting and placement of the glass sheet, the assembly of the parts, and the removal and polishing of the excess glass from the assembled pole parts after the heating step present time consuming and tedious assembly steps.

Another known method of forming a glass filled gap in a magnetic head consists of placing shims between the pole parts, and subsequently melting a glass rod positioned above the resultant space or gap. The rod will enter and fill the gap by capillary action. This process provides a relatively good control over the gap width, but presents other difficulties. The very thin shim material, usually platinum, is difficult to produce and to position between the pole parts. The lower thickness limit of the gap is normally determined by the lower practical thickness limit of the shim. Very thin shims are difficult to produce and to manipulate into position. There is also the possibility that the pole parts will bend between the shims as they are assembled. Also, the positioning of the glass rod in the precise position adjacent the gap is a tedious task. The filling of the gap by capillary action is a very time consuming process step. The aforementioned difficulties in the known methods of forming accurate gap widths in magnetic heads is particularly meaningful when it is realized that the gap width desired in modern heads is on the order of 100 microinches or less.

It is an object of this invention to provide a new method for accurately spacing and firmly adhering elements in spaced relation.

It is another object of this invention to provide a new method for accurately spacing and adhering pole parts of a magnetic head to form a gap.

It is still another object of this invention to provide a method of accurately filling a space between two elements preferably with a material having approximately the same coefficient of expansion as the coefficient of expansion of the material of elements.

Still another object of this invention is to provide a new method of precisely spacing portions of sintered magnetic material pole parts of a magnetic recording head to define a gap and simultaneously forming an adherent layer of nonmagnetic material in the gap to permanently maintain the spacing of the parts.

Another object of this invention is to provide a new method of forming a gap in a magnetic head which does not entail tedious and time consuming hand operations present in the known methods of forming a gap.

Still another object of this invention is to provide a new method of forming and filling a gap between pole parts that is adaptable to mass production operations.

Still another object of this invention is to provide a new method of forming a gap between magnetic pole parts wherein the width of the gap can be positively and precisely controlled.

Still another object of this invention is to provide a new method for producing a glass filled gap between pole parts of a magnetic head which can be performed in a minimum amount of time with a minimum expenditure of effort.

These and other objects are accomplished in accordance with the broad aspects of the present invention of a method of spacing and adhering individual parts. In practicing the method of the invention a first layer of glass having a predetermined thickness is applied to each of the respective parts. A second relatively thin layer of glass is disposed on at least one of the respective parts over the first layer of glass. The glass of the second layer has a softening point appreciably less than the softening point of the glass of the first layer. The respective parts are then assembled with the layers of glass in abutting relation. The resultant assembly is then heated to a temperature of approximately the softening temperature of the glass of the second layer. During the heating step the glass of the second layer becomes soft and adheres the first layers together in assembled relation. The first glass layers are not materially softened by the heating and thereby maintain the spacing of the parts within close tolerances. The assembly is then cooled.

The new method of our invention is a very significant advance for accurately forming and filling gaps between circuit pole parts of magnetic heads and related assembly. In our new method it is possible to space elements with a great degree of accuracy. The high softening point glass coatings provide abutment means which prevent the parts from being forced together while permitting a necessary reasonable amount of pressure to be applied to hold the elements in their assembled relation. The amount of pressure used to hold the elements in assembly is not critical, as is the case in one of the aforementioned known prior art method of assembly. The method of the invention eliminates the time consuming and tedious technique of preparing and placing thin and fragile shims between pole parts, positioning fragile glass rods, etc. The method of the invention does not require heating the parts for long periods of time and is particularly adaptable for mass production techniques. The method of the invention can be used for various purposes other than producing magnetic heads, as for example, attaching electrical components, such as transistor chips, to substrates, producing graded and hermetic seals, etc.

The foregoing and other objects, features and advantages of the invention will be apparent from the following more particular description of the preferred embodiments of the invention, as illustrated in the accompanying drawings.

Figures 1, 2, 3, 3A, 4, 5:
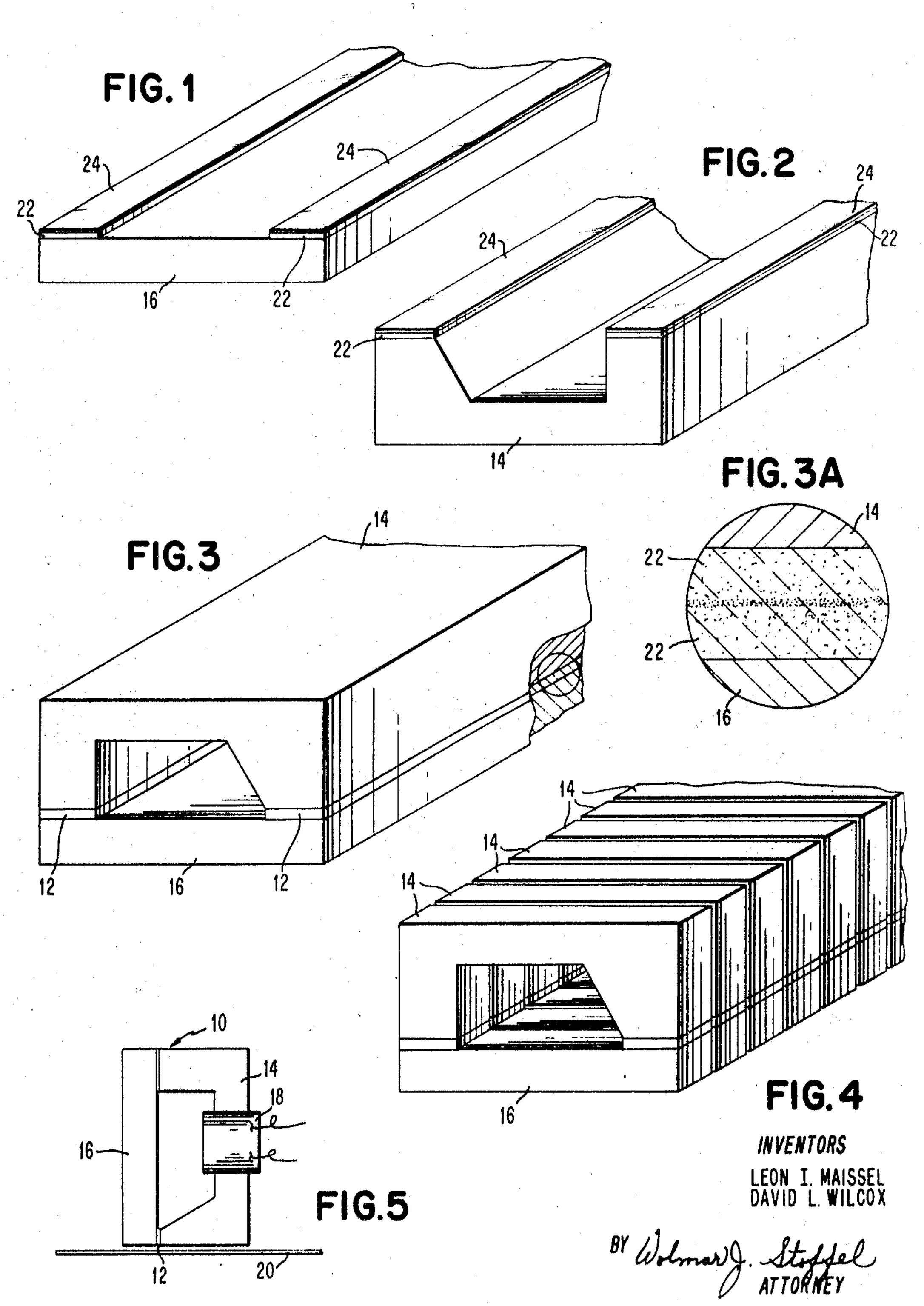
FIG. 1 is a perspective view in greatly enlarged scale of a first elongated pole part showing the glass coatings disposed thereon in accordance with a preferred specific embodiment of our invention.
FIG. 2 is a perspective view in greatly enlarged scale of a second pole part showing the glass coatings disposed thereon prior to assembly of the part shown in FIG. 1.
FIG. 3 is a perspective view in greatly enlarged scale illustrating parts shown in FIGS. 1 and 2 in assembled relation following the heating step.
FIG. 3A is a detailed view in cross section in enlarged scale showing the structure of the glass layers following the heating step.
FIG. 4 is a perspective view in an enlarged scale illustrating the severing of the elongated pole parts shown in FIGS. 1 through 3.
FIG. 5 is a side elevational view of a magnetic head in combination with a magnetic tape.

Referring now to the figures of the drawing, there is shown in FIG. 5, in enlarged scale, a typical magnetic head 10 which can be produced with an accurately spaced glass filled gap 12 in accordance with the method of our invention. The magnetic head 10 has a pole part 14 having a generally U-shaped cross sectional configuration, and a second pole part 16 having an I-shaped cross sectional configuration. Disposed about the center portion of pole part 14 is a coil 18. In operation, a tape 20 is moved relative to head 10 in a direction generally transverse to the direction of gap 12. The pole parts 14 and 16 are made of a magnetic material, as for example sintered nickel-zinc-ferrite.

In FIGS 1 through 4 a preferred specific embodiment of the method of our invention is illustrated. The method of the invention is described and illustrated in relation to producing the gap 12 in the magnetic head structure 10 illustrated in FIG. 5. First layers of glass 22 are applied to the areas of pole parts 14 and 16 which will in their assembled relation abut. The layer of glass 22 can have any suitable thickness, which thickness is dictated by the specific application of the device being produced. However, the method of our invention is utilized to the fullest advantage in producing a thickness of glass 22 that is relatively thin, preferably in the range of 30 to 500 microinches, more preferably in the range of 40 to 120 microinches. The glass of the first layer 22 preferably has approximately the same coefficient of expansion as the material of the core parts 16 and 14 respectively. Further, the glass of the layer 22 will have a relatively high softening point, preferably in the range of 700° to 950° C. A preferred glass for forming layer 22 is Corning glass identified as number 1720, which has a softening point of 910° C. and a coefficient of expansion of $4.6\times10^{-6}$ inches/inch/° C. This glass is particularly adapted for use with circuit parts made of sintered ferrite material since the coefficients of expansion are relatively close. The material of the glass layer 22 should have a coefficient of expansion that is approximately equal to or slightly less than the coefficient of expansion of the core part on which it is to be adhered.

Another typical high melting point glass suitable for producing layer 22 has the following composition and physical characteristics:

| | BaO | $Al_2O_3$ | $SiO_2$ | $B_2O_3$ | $As_2O_3$ | CaO |
|---|---|---|---|---|---|---|
| Mol percent | 22.8 | 5.7 | 52.9 | 11.4 | 0.2 | 7.0 |
| Wt. percent | 41.3 | 6.8 | 37.5 | 9.3 | 0.5 | 4.6 |

Softening point=792° C.
Coefficient of expansion=$70.4\times10^{-7}$ inches/inch/° C.

The aforementioned glasses are set forth as typical types of glasses that can be used. Any suitable glass composition having the desired characteristics can be used in the practice of the method of the invention.

The glass layers 22 can be applied to the circuit parts 14 and 16 in any suitable manner which will result in a thin uniform coating. The most preferred method of applying the glass layer 22 is accomplished by R.F. sputtering techniques. "Sputtering" refers to the ejection of atoms from a material through the impact of ions or atoms. R.F. sputtering is used when the material to be applied is an insulator, such as glass. A high frequency potential is applied to a metal electrode positioned behind the insulator. Power is fed into the resulting glow via the displacement current through the insulator, or dielectric material and sputtering occurs because the insulator is alternately ion bombarded and electron bombarded. The positive charge which accumulates on the surface of the insulator during the negative or sputter portion of each cycle is neutralized by electrons during the positive part of the cycle. The insulator is then under bombardment of high energy ions and will be sputtered. When a substrate is placed near the insulator material that is being ion bombarded, it can collect the material to form a thin film. R.F. sputtering is described in detail in commonly assigned application Ser. No. 428,733, filed Jan. 28, 1965, entitled "Electrode Assembly for R.F. Sputtering of Insulators." However, any suitable method can be used to apply the glass layer 22 which will result in the application of a uniform thin layer. For example, the coating 22 can be applied in the manner described in commonly assigned U.S. Patent 3,212,921, issued Oct. 19, 1965 and entitled "Method of Forming a Glass Film on an Object and the Product Produced Thereby." The method in the aforemention application for patent involves placing a substrate in a solution containing finely divided glass particles, centrifuging, and subsequently sintering the coating deposited upon a substrate.

A second coating or layer of glass 24 is then applied over the first layer of glass 22 on one, or preferably both, of the parts 14 and 16. A layer of glass 24 can also be applied by the same techniques described previously. The glass of the layer 24 should have a lower softening point, preferably at least 150° less than the softening point of the glass material in the layer 22, and a coefficient of expansion as close as possible to the coefficient of expansion of the glass of the layer 22. In general the softening point of the glass material in the layer 24 will be in the range of 450°–650° C. The layer 24 can be any suitable thickness. The relative thickness of the layers of glass 24 and 22 is preferably in the range of 1:4 to 1:20. Normally the thickness of layer 24 is in the range of 4 to 15 microinches.

Typical low softening point glasses suitable for producing the layer 24 have the following compositions and physical characteristics:

| | PbO | $Al_2O_3$ | $SiO_2$ |
|---|---|---|---|
| Mol percent | 48.0 | 12.0 | 40.0 |
| Wt. percent | 74.7 | 8.5 | 16.8 |

Softening point=598° C.
Coefficient of expansion=$71.3\times10^{-7}$ inches/inch/° C.

| | PbO | $Al_2O_3$ | $SiO_2$ | $B_2O_3$ |
|---|---|---|---|---|
| Mol percent | 32.8 | 8.2 | 41.0 | 18.0 |
| Wt. percent | 61.3 | 7.0 | 20.6 | 11.1 |

Softening point=550° C.
Coefficient of expansion=$67.5\times10^{-7}$ inches/inch/° C.

Additional glasses which have been found useful in the practice of the invention are Corning 1826 with a softening point of 585° C. and a coefficient of expansion of $4.9\times10^{-6}$ inches/inch/° C., Corning 7561 with a softening point of 530° C. and a coefficient of expansion of $6.5\times10^{-6}$ inches/inch/° C., and Corning 7570 with a softening point of 440° C. and a coefficient of expansion of $8.4\times10^{-6}$ inches/inch/° C. The aforementioned glasses are set forth as typical of the type of glasses that can be used. It is to be understood that any suitable glass composition having the desired characteristics can be used in the practice of the method of the invention.

After the respective glass coatings have been applied to the elongated pole parts 14 and 16, the parts are then assembled with the layers 24 in abutting relation as illustrated in FIG. 3. The resultant assembly is then heated to the softening temperature of the glass of the second layer 24. The assembly can be maintained with a suitable holding pressure, preferably of approximately 170 grams per square centimeter. During the heating step the glass layers 24 become relatively soft while the layers 22 remain firm thereby maintaining the spacing of the elongated parts 14 and 16. Upon cooling, a firm bond between layers 22 is formed by the layers 24, as illustrated most clearly in FIG. 3A of the drawing. The glass coatings 22 remain relatively firm during the heating step to thereby maintain a spacing of parts 14 and 16 in the area of the gap to within very close tolerances. The resultant assembly consisting of elongated parts 14 and 16 is then cooled to room temperature and severed into separate magnetic head units as indicated in FIG. 4 of the drawing. A winding 18 can then be disposed on one of the circuit core parts as illustrated in FIG. 5, and assembled into the desired apparatus. As indicated in FIG. 5, the ends of each of the severed head units is cut away adjacent the tapered end of part 14 to form a throat gap having materially less area than the gap area provided on the opposite end of the unit.

It is to be understood that the method of our invention can be utilized in other applications than in providing precise gaps, in magnetic heads. For example, the method of our invention can be used to attach silicon transistor chips to substrate, assemble and adhere various elements of integrated circuitry, produce graded seals, etc. It is also understood that the term "glass" is to be interpreted broadly to include any ceramic material which will satisfy the criteria of a specific application of the invention.

While the invention has been particularly shown and described with reference to the preferred embodiments thereof, it will be understood by those skilled in the art that various changes in form and details may be made therein without departing from the spirit and scope of the invention.

What is claimed is:

1. A method of precisely spacing end portions of sintered ferrite material circuit pole parts of a magnetic recording head to define a gap and simultaneously forming an adherent layer of glass in the gap to permanently maintain the spacing of the parts comprising:

applying by R.F. sputter techniques a first layer of glass to each of the respective pole parts, said layer of glass having a thickness in the range of 40–50 microinches, said glass of said first layer having a softening point in the range of 700°–950° C. and a thermal coefficient of expansion approximately equal to the thermal coefficient of expansion of said sintered ferrite material of said pole parts, applying by R.F. sputter techniques a second layer of glass on the respective pole parts over the first layer, said second layer of glass having a thickness in the range of 4–15 microinches, the glass of said second layer having a softening point at least 150° C. less than the softening point of the glass of said first layer, and a coefficient of expansion approximately equal to the coefficient of expansion of the glass of the said first layer, positioning the respective pole parts in assembled relation with the second layers of glass in abutting relation, maintaining a holding pressure of approximately 170 grams per square centimeter, while heating the resultant assembly to the softening temperature of the glass of said second layer, and cooling the assembly.

2. The method of claim 1 in which one of said pole parts is an elongated element having a generally U-shaped cross sectional configuration, and the other of said pole parts is an elongated element having an I-shaped cross sectional configuration, wherein:

said first and said second glass layers are disposed on the ends of the first mentioned pole part and on the side of the last mentioned pole part, said assembly upon cooling is transversely severed into individual elements, and a winding is disposed on each of the resultant elements positioned on the base of the pole part having the U-shaped cross sectional configuration.

3. A method of spacing portions of circuit parts of a magnetic recording head to define a gap and simultaneously forming an adherent layer of glass in the gap to permanently maintain the spacing comprising:

applying by R.F. sputter techniques a first layer of glass to each of the respective pole parts, the glass of said first layer having a relatively high softening point and a thermal coefficient of expansion approximately matching the thermal coefficient of expansion of the material of said circuit parts, applying by R.F. sputter techniques a second relatively thin layer of glass on at least one of said pole parts over the first layer of glass, the glass of said second layer having a softening point appreciably less than the softening point of the glass of said first layer, positioning the respective pole parts in assembled relation with the second layers of glass in abutting relation, heating the resultant assembly to the softening point temperature of the glass of said second layer, and cooling the assembly.

4. The method of claim 3 wherein the glass of the first layer has a softening point in the range of 700°–950° C.

5. The method of claim 4 wherein the glass of said second layer has a softening point in the range of 450°–650° C.

6. The method of claim 3 wherein the ratio of the thicknesses of the first layer of glass and the second layer of glass respectively is in the range of from 4:1 to 20:1.

7. The method of claim 3 wherein the thickness of the first layer of glass is in the range of 40–50 microinches.

8. The method of claim 7 wherein the second layer of glass is formed with a thickness in the range of 4–15 microinches.

References Cited

UNITED STATES PATENTS

| | | | |
|---|---|---|---|
| 2,642,633 | 6/1953 | Dalton. | |
| 3,246,384 | 4/1966 | Vice | 29—603 |
| 3,249,700 | 5/1966 | Duinker et al. | 179—100.2 |
| 3,283,396 | 11/1966 | Pfost | 29—603 |
| 3,319,320 | 5/1967 | Cruthers | 29—620 |

JOHN F. CAMPBELL, Primary Examiner

C. E. HALL, Assistant Examiner

U.S. Cl. X.R.

179—100; 340—174; 346—74